March 1, 1966  HISANORI ATAKA  3,237,542
AUTOMATIC FILM WINDING APPARATUS FOR PHOTOGRAPHIC CAMERAS
Filed Dec. 23, 1963  2 Sheets-Sheet 1

United States Patent Office 3,237,542
Patented Mar. 1, 1966

3,237,542
AUTOMATIC FILM WINDING APPARATUS FOR PHOTOGRAPHIC CAMERAS
Hisanori Ataka, Tokyo, Japan, assignor to Kabushiki Kaisha Ricoh, Tokyo, Japan, a corporation of Japan
Filed Dec. 23, 1963, Ser. No. 332,578
Claims priority, application Japan, Dec. 24, 1962, 37/58,617
1 Claim. (Cl. 95—31)

This invention relates to automatic film winding apparatus for photographic cameras in which films having series of side perforations for feeding are used.

The primary object of the present invention is to provide an automatic film winding apparatus of the kind specified in which a rotatable film winding shaft is acted on by spring means, and after the shutter of the camera has been opened and closed by depression of the shutter button by the operator's finger, and upon release of the operator's finger from the button, the film is automatically fed by one-frame length for the next exposure.

Another object of the present invention is to provide a photographic camera having an automatic film winding apparatus contained in either the upper or the lower portion of the camera, constructed by a relatively small number of essential elements, and positive in operation.

These and other objects and particularities of the present invention, will be made obvious from the following detailed description of the invention, with reference to the accompanying drawings, in which.

Figure 1:
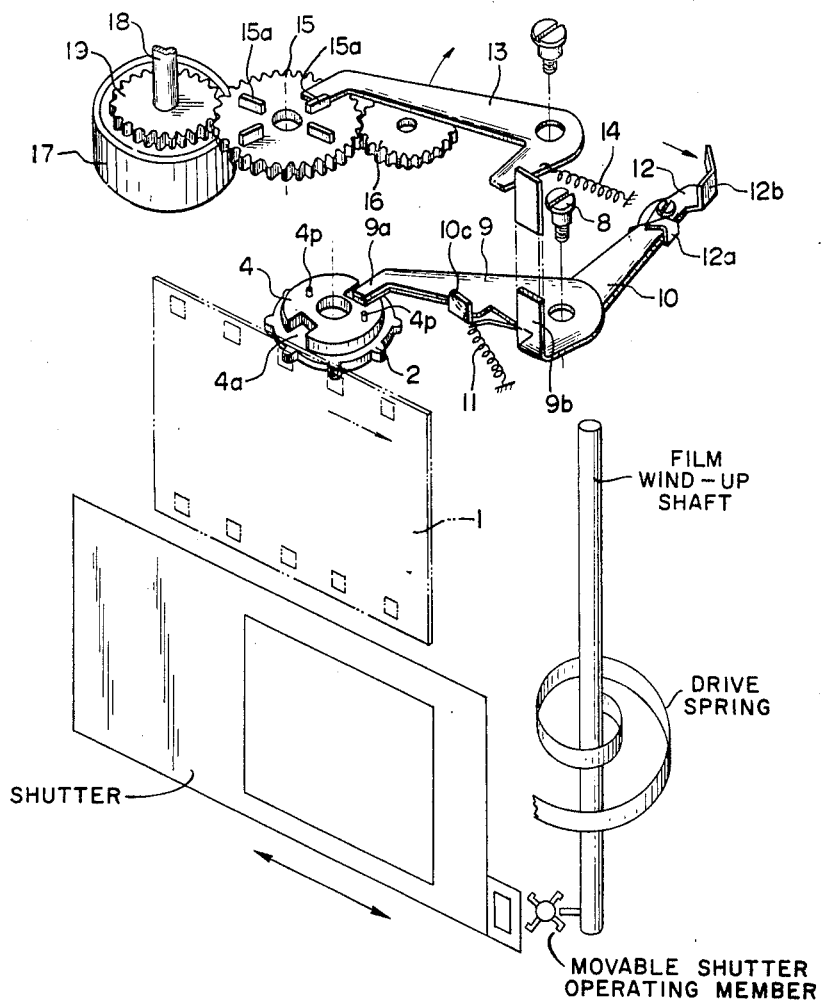
FIG. 1 is a perspective and exploded view of essential parts of an automatic film winding apparatus embodying the present invention.
Figure 2:
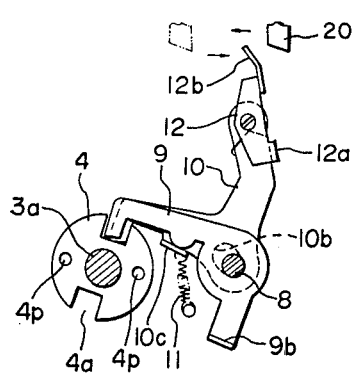
FIGS. 2, 3 and 4 are plan views showing various relative positions of several elements when in operation.
Figure 5:
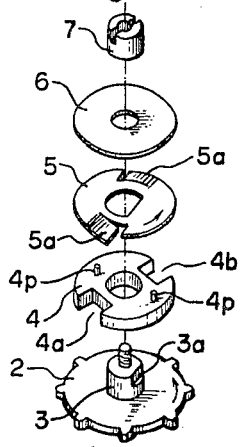
FIG. 5 is a perspective and exploded view of several elements mounted on a common shaft.

Referring to the accompanying drawings, particularly to FIG. 1 thereof, a photographic film 1 is provided with a series of side perforations at both side edges thereof for feeding purpose, and is fed in the direction of the arrow by a spring-loaded wind-up shaft (not shown). A sprocket wheel 2 is mounted on a shaft with its teeth engaging the side perforations of photographic film 1, and mounted in a suitable position within the camera body. As shown in FIG. 5, the shaft 3 of sprocket wheel 2 supports also an engaging plate 4, a pawl plate 5 and a restraining plate 6, these plates being prevented from being disassembled from the shaft by means of a head screw 7. The engaging plate 4 has two cut-outs 4a and 4b in the periphery at diametrically opposite positions, and two pins 4p projecting from the upper surface thereof, the pins 4p corresponding to resilient pawl pieces 5a extending from the outer periphery of pawl plate 5 obliquely downwards. When the pawl pieces are rotating in the direction of the arrow, the ends of the pawl pieces engage the pins 4p to rotate the engaging plate 4 in the same direction, but when the pawl pieces rotate in the opposite direction, the pawl pieces ride over the ends of pin 4p, thereby not rotating the engaging plate 4. The plate 4 is free on the shaft 3, while the pawl plate 5 is rotatable with shaft 3 by means of cut-off portion 3a of shaft 3. An engagement lever 9 and a disengagement lever 10 are pivotally mounted on a shelf plate or the like of the camera body by means of a common shaft 8, and the levers 9, 10 have ends 9a and 10a, respectively, which are adapted to engage and disengage the cut-outs of engaging plate 4 at suitable times. The engagement lever 9 has a riser piece 9b which an arm of a bell-crank 13 engages with pressure, as will be hereinafter explained. The disengagement lever 10 has an axis bore 10b which is oblong as shown in FIG. 2 by dotted line, so that the lever 10 may move slightly in the direction of length of oblong bore 10b.

Referring to FIG. 1, the lever 10 is provided with a rising piece 10c formed at the front side of one arm thereof, and the engagement lever 9 has a side-edge portion engaging under pressure the inner surface of rising piece 10c. A spring 11 has one end secured to lever 10 and the other end anchored to stationary portion of the camera, and tends to rotate the lever 10 in counterclockwise rotation, while at the same time, tending to slide the lever 10 along the oblong bore 10b, or obliquely downwards to the right in FIG. 2. In this figure, the other arm end of disengagement lever 10 carries a swing link 12 pivoted thereto at the other arm end and having a tendency to rotate clockwise. One arm of swing link 12 has a depending piece 12a at the righthand edge of the arm, which depending piece engages the corresponding edge of lever 10 with pressure to prevent rotation of link 12. The other arm of swing link 12 forms a vertical projection piece 12b which is acted upon by a movable member 20. This movable member 20 is interconnected with the releasing push link of the shutter, so that it normally takes the position shown in solid lines in FIG. 2, that is, to the right of swing link 12, and when the releasing push link is pushed down by the operator's finger, it is moved in the direction of the arrow from the abovementioned position to rotate the swing link 12 in the counterclockwise direction (see FIG. 3) to the position shown in dotted lines in FIG. 2. When the push link is released from the operator's finger, it returns to its original position by its own tendency.

In FIG. 1, the movable member 13 is pivotally mounted on a suitable stationary member and has a tendency to rotate counterclockwise under the action of spring 14. One arm of movable member 13 is in contact under pressure with one side edge of riser piece 9b of lever 9, while the end of the other arm is normally positioned in the rotary path of projection 15a on a toothed wheel 15 positioned thereunder. The toothed wheel 15 is in engagement with a toothed wheel 16 which is rotated at relatively high speed by a driving spring of the film winding mechanism, as well as with a toothed wheel 19 on a governor shaft 18 extending out of stationary cylindrical case 17 of the governor. The above-mentioned governor may be of such a construction that suitable frictional elements having a tendency to stretch out on the governor shaft 18 by centrifugal action will produce frictional resistance between the frictional elements and the inner surface of cylindrical case 17 in proportion to the number of rotations per minute of governor shaft 18, so that the film wind up speed may be maintained substantially constant in spite of gradual decrease of resilient force in the above-mentioned driving spring damping down gradually as the number of woundup frames of the film is increased, whereby the film-feeding speed is held substantially constant from the beginning to the end of feeding operation of one roll of film. In other words, the photographic film is always fed by one-frame-length accurately by one automatic feeding operation for its entire length.

Figure 3:
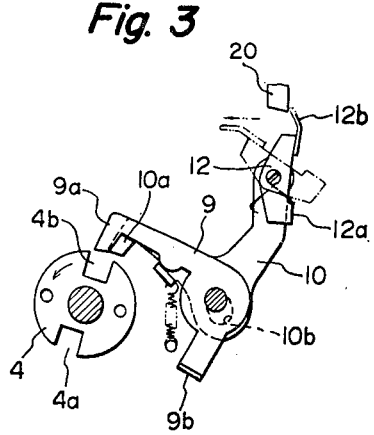

In operation, referring to FIG. 1, the gear 15 tends to rotate in the direction shown by the arrow under the action of the resilient force of the drive spring which has been manually wound up, but since the end of movable member 13 is in engagement with projection 15a on the gear 15, the gear cannot rotate, and the force of the driving spring cannot operate the gear 15. At this time, if the shutter release button is depressed, the movable member 20 shown in solid lines in FIG. 2 is moved in the direction of the arrow to the position shown by dotted lines, the shutter is opened and closed to expose the film. Thereafter, when the shutter release button is released by the operator, the movable member 20 is returned to its original position, and on its return to the original position, it pushes the end of swing link 12 to the right as shown in FIG. 3 in solid lines, and the disengagement lever 10 is rotated clockwise about axis 8, resulting in disengagement of the lever end 10a from cut-out 4a, and at the same time, the force of spring 11 acts on the lever 10 to shift the same to the right obliquely downwards along the oblong bore 10b. Consequently, the movable member 20 moves further to the right, resulting in disengagement from the end of swing link 12. Now, the disengagement lever 10 cannot return to the original position shown in FIG. 2 by the force of spring 11, by virtue of the fact that the end of lever 10 is out of alignment with the opening of cut-out 4b. When the disengagement lever 10 is being rotated clockwise, the rising piece 10c rotates the engagement lever 9 in contact therewith under pressure in the same direction, and the end 9a thereof is also disengaged from cut-out 4a. At the same time, the riser piece 9b of engagement lever 9 also pushes one arm of movable member 13 to rotate against the force of spring 14, so that the end of the other arm of movable member 13 moves out of the rotary path of projections 15a on gear 15, and all the gears, that have been prevented from rotating, now begin to rotate by the spring force acting thereon, and the film is fed simultaneously in the direction of arrow to be taken up by the take-up shaft, not shown.

Figure 4:
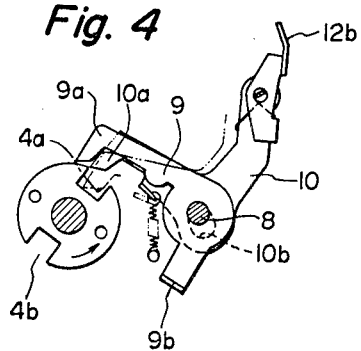

Along with the above-described feed of the film, the sprocket wheel 2 in engagement with the side perforations is rotated in the direction shown by the arrow in FIG. 5, and consequently, the engaging plate 4 is rotated in the same direction through the pawl piece 5a of pawl plate 5 which is rotatable in unison with the sprocket wheel 2. When the engaging plate 4 has rotated through an angle corresponding to one-frame length of the film, that is to say, when the plate 4 in the state shown in FIG. 3 has been rotated by substantially half a revolution in the direction shown by the arrow to assume the position shown in FIG. 4, the end 10a of disengagement lever 10 in pressure contact with the periphery of engaging plate 4 by virtue of spring 11 becomes engaged in the other cut-out 4a as shown in FIG. 4 by chain lines. Further, when the engaging plate 4 has rotated in the same direction, the lever 10 is shifted along the length of oblong bore 10b against the force of spring 11, the end 9a of engagement lever 9 drops into the above-mentioned cut-out to prevent further rotation of sprocket wheel 2 through pawl plate 5, and at the same time, the bell-crank lever 13 which was rotated in the direction shown by the arrow under the pushing action of riser piece 9b of engagement lever 9, returns to the original position as shown in FIG. 1, so that the end of bell-crank lever 13 resumes the position in the rotary path of projections 15a of toothed wheel 15 to prevent rotation of the latter. As a result, the drive spring, not shown, for the photographic film become inoperative, and the devise resumes the normal state as shown in FIG. 1.

When the film is rewound after photographing has been completed for one roll of film, the film is manually rewound onto the rewinding shaft in the direction opposite to the arrow, and the sprocket wheel 2 shown in FIG. 5 is rotated in the direction opposite to the arrow. At this time, the engaging plate 4 is prevented from rotation by the end 9a of engagement lever 9, and consequently, the pawl piece 5a of pawl plate 5 which is rotated in unison with sprocket wheel 2 will ride over the pin 4p on engaging plate 4 to rotate freely in the clockwise direction.

In the embodiment of the invention described above, the photographic film is fed by one-frame length when the engaging plate 4 has completed half a revolution, and the plate 4 is provided with two cut-outs positioned in diametrical opposition. However, the device may be designed so that the film is fed by one-frame length when the engaging plate has completed one revolution, in which case only one cut-out will be provided on the plate 4.

The shutters to be used in carrying out the present invention may be conventional ones, and may be interconnected with the film winding mechanism by any suitable means, which may be activated simultaneously with the film winding mechanism. Alternatively, the shutter spring may be activated in association with the operation of depressing the shutter button, or the shutter may be of such a nature that when the shutter button is depressed, the shutter is opened and closed. When the shutter is of the latter construction, the shutter is not required to be interconnected with the film winding mechanism.

What is claimed is:

Automatic film winding apparatus for a photographic camera, comprising a sprocket wheel journalled in said camera and adapted for engaging the film, an engaging plate operatively coupled with said sprocket wheel and rotatable in unison with said wheel in one direction only, said engaging plate having at least one cut-out, an engagement lever nad a disengagement lever mounted superposed on a common shaft and having portions respectively for releasably engaging in said cut-out at appropriate times, means acting on said levers to urge the same in a direction of rotation such that said portions of the levers are urged into said cut-out, said two levers being operatively coupled so that only when the disengagement lever is swung in such a direction that it is released from said cut-out, the engagement lever is also swung in the same direction, said disengagement lever having an oblong bore for mounting on said common shaft, whereby when said portion of the disengagement lever is disengaged from said cut-out on said engaging plate, the portion of the disengagement lever is shifted with respect to the cut-out so that said cut-out and said portion are misaligned with each other, a third lever disposed in said camera and having one arm in pressure contact with said engagement lever for being moved thereby, a relatively high-speed rotatable element adapted for advancing the film, said third lever having another arm positioned adjacent said high-speed rotatable element for releasing the latter when said third lever is moved by the engagement lever, and a movable member adapted for being operated upon closing operation of the shutter of the camera, said disengagement lever being positioned in the path of said movable member for being rotated thereby such that said portion of the disengagement lever becomes disengaged from the cut-out, a film winding shaft, and a drive spring for supplying torque to said rotatable element and said film winding shaft.

No references cited.

NORTON ANSHER, *Primary Examiner.*

EVON C. BLUNK, *Examiner.*